US010120823B2

(12) United States Patent
Waidhofer et al.

(10) Patent No.: US 10,120,823 B2
(45) Date of Patent: Nov. 6, 2018

(54) HOST-SAFE FIRMWARE UPGRADE OF A PCI EXPRESS DEVICE

(71) Applicant: Toshiba Memory Corporation, Minato-ku, Tokyo (JP)

(72) Inventors: Gordon W. Waidhofer, Irvine, CA (US); Ali Aiouaz, San Jose, CA (US); Christopher Delaney, Orange, CA (US); Leland Thompson, Tustin, CA (US)

(73) Assignee: Toshiba Memory Corporation, Tokyo (JP)

( * ) Notice: Subject to any disclaimer, the term of this patent is extended or adjusted under 35 U.S.C. 154(b) by 252 days.

(21) Appl. No.: 14/866,087

(22) Filed: Sep. 25, 2015

(65) Prior Publication Data
US 2017/0090948 A1   Mar. 30, 2017

(51) Int. Cl.
*G06F 13/40* (2006.01)
*G06F 8/654* (2018.01)
(Continued)

(52) U.S. Cl.
CPC .......... *G06F 13/4022* (2013.01); *G06F 8/654* (2018.02); *G06F 9/4403* (2013.01); *G06F 13/4282* (2013.01)

(58) Field of Classification Search
CPC .... G06F 9/442; G06F 9/4411; G06F 13/4022; G06F 8/665; G06F 9/4403; G06F 13/4282
(Continued)

(56) References Cited

U.S. PATENT DOCUMENTS 6,708,231 B1 * 3/2004 Kitagawa .................. G06F 8/65
710/10
7,024,548 B1 * 4/2006 O'Toole, Jr. ........ H04L 41/0813
709/220
(Continued)

OTHER PUBLICATIONS

NVM Express Revision 1.1. Specification. Intel Corporation, 2012 [retrieved on Jul. 25, 2017]. Retreieved from the Internet: <URL: http://nvmexpress.org>.*

*Primary Examiner* — Tim T Vo
*Assistant Examiner* — Herve Iradukunda
(74) *Attorney, Agent, or Firm* — White & Case LLP (57) ABSTRACT

A method and a computer readable medium comprising instructions for upgrading a firmware of a peripheral device connected to a host device via a Peripheral Component Interconnect Express (PCIe) bus from the operating system (OS) of the host device is disclosed. In one embodiment, the method and computer readable medium instructions includes halting host device access to the peripheral device after detecting the peripheral device has completed a shutdown sequence, and resetting the peripheral device after a predetermined time period after completion of the shutdown sequence. The method and computer readable medium instructions further includes initializing the firmware stored in a persistent storage location of the peripheral device, and re-establishing a connection between the peripheral device and the host device. In one embodiment, the predetermined time period is greater than a time it takes for the host device to detect the peripheral device has completed the shutdown sequence. In one embodiment, the peripheral device is a Non-Volatile Memory Express (NVMe)-compliant data storage device.

21 Claims, 5 Drawing Sheets

(51) Int. Cl.
*G06F 9/44* (2018.01)
*G06F 13/42* (2006.01)
*G06F 9/4401* (2018.01)

(58) Field of Classification Search
USPC .......................... 709/222; 713/1, 2; 717/168
See application file for complete search history.

(56) References Cited

U.S. PATENT DOCUMENTS

| | | | | |
|---|---|---|---|---|
| 2006/0053246 | A1* | 3/2006 | Lee | G06F 9/4403 |
| | | | | 711/100 |
| 2009/0241103 | A1* | 9/2009 | Pennisi | G06F 8/65 |
| | | | | 717/173 |
| 2013/0073897 | A1* | 3/2013 | Khmelnitsky | G06F 11/1417 |
| | | | | 714/6.11 |
| 2013/0132700 | A1* | 5/2013 | Liu | G06F 12/00 |
| | | | | 711/170 |
| 2013/0311680 | A1* | 11/2013 | Bolen | G06F 9/4411 |
| | | | | 710/8 |
| 2014/0181365 | A1* | 6/2014 | Fanning | G06F 12/0246 |
| | | | | 711/103 |

* cited by examiner

HOST-SAFE FIRMWARE UPGRADE OF A PCI EXPRESS DEVICE

FIELD OF THE INVENTION

This invention generally relates to upgrading the firmware of a peripheral device connected to the host device via a Peripheral Component Interconnect Express (PCIe) bus.

BACKGROUND OF THE INVENTION

Modern computer systems have become increasingly modular to allow for cost-effective expansion or upgrading of the systems' capabilities. Typically, a computer system comprises a "host" device that contains the core computing hardware that that the operating system (OS) runs on, and "peripheral" device(s) that expand the functions and features of the hardware of the host device. The peripheral device is connected to the host device through a communications interface, such as a Universal Serial Bus (USB), a Serial AT Attachment (SATA) bus, a Small Computer System Interface (SCSI) bus, or the like. For many peripheral devices, an intermediary manages the communication between the peripheral device and the host device. For example, in the case of a SATA-connected peripheral device, a Host Bus Adapter (HBA) operating under the Advanced Host Controller Interface (AHCI) is used to manage the communication link between the peripheral device and the host device.

Figure 1:
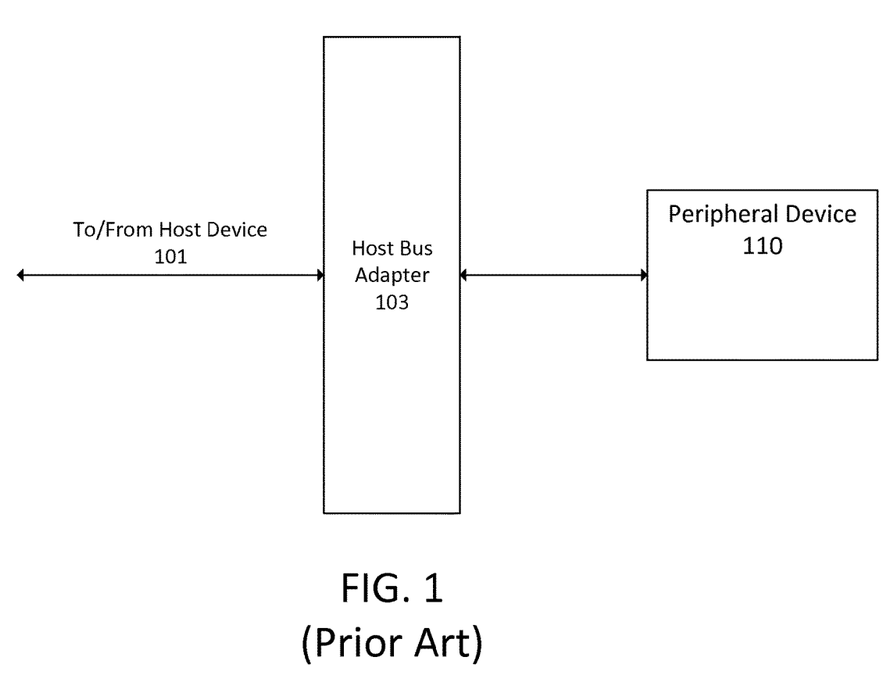
FIG. 1 is a block diagram of a peripheral device connected to a host device with a host bus adapter, according to the prior art.

FIG. 1 shows a block diagram of a Peripheral Device 110 connected to a Host Device 101 with a Host Bus Adapter 103. As shown in FIG. 1, the HBA 103 acts as an intermediary between the Peripheral Device 110 and the Host Device 101, isolating the Peripheral Device 110 from the Host Device 101 such that a fault or device failure at the Peripheral Device 110 will not propagate to the Host Device 101. Because the HBA 103 isolates the Peripheral Device 110 from the Host Device 101, the HBA 103 also allows for easy system maintenance of the Peripheral Device 110, including for example, updating the firmware of the peripheral device, physically replacing a defective peripheral device with a new device, and so forth, without interrupting the operation of the Host Device 101. This is critical in many enterprise and consumer applications where host system downtime is undesirable or unacceptable.

Figure 2:
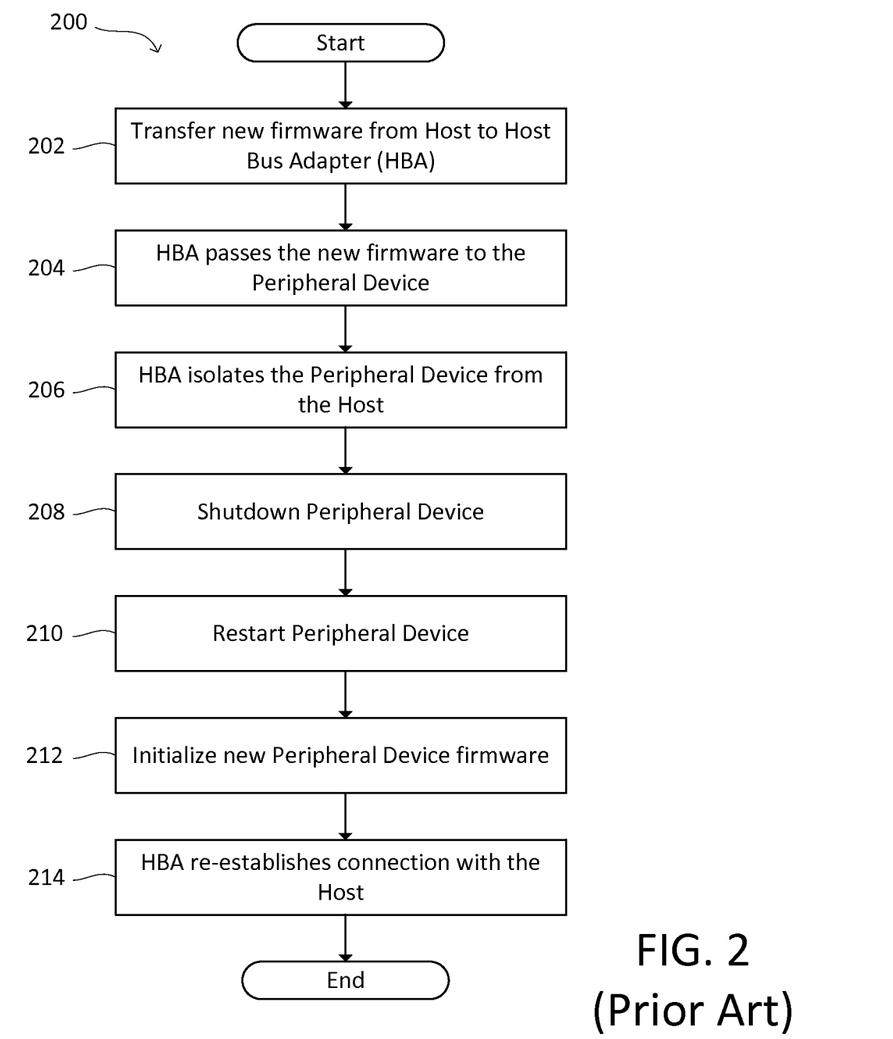
FIG. 2 is a flowchart of method steps for upgrading the firmware of a peripheral device with a host bus adapter, according to the prior art.

FIG. 2 shows a flowchart of method steps 200 for upgrading the firmware of a peripheral device with an HBA, according to the prior art. At step 202, the host device transfers the new firmware for the peripheral device to the HBA, which in turn passes the new firmware to the peripheral device in step 204. After the new firmware is received by the peripheral device, the HBA isolates the peripheral device from the host device in step 206. Any attempts by the host device to access the peripheral device while the peripheral device is shut down in step 208 and restarted in step 210, which may result in a host device error or complete system failure, will be instead intercepted by the HBA. In step 212, the new firmware is initialized on the peripheral device and the peripheral device is ready to resume operation in step 214 after the HBA re-establishes the connection between the peripheral and host devices. As shown and described in FIG. 2, the HBA allows for a host-safe upgrade of a peripheral device with minimal interruption to the host device operation.

While the HBA provides a number of benefits to the operation of the peripheral device, there are serious drawbacks as well. As shown in FIG. 1, because information passes through the HBA 103 on its way to the Peripheral Device 110 from the Host Device 101, and vice-versa, the HBA 103 introduces latency into the communication path between the Peripheral Device 110 and the Host Device 101. This latency limits the data I/O throughput and speed of the communication between the Peripheral Device 110 and the Host Device 101. Moreover, the HBA 103 is typically implemented in hardware, which increases power consumption and takes up physical space in the Host Device 101. As peripheral devices improve in performance and complexity, and as both host and peripheral devices move to lower-power operation, the drawbacks of the HBA begin to outweigh the benefits, and there has been a shift to remove the HBA from the equation and directly connect the peripheral device to the host device, such as is done via a Peripheral Component Interconnect Express (PCIe) bus.

Removing the HBA also means losing the benefits the HBA provided, including isolating the peripheral device from the host device during a firmware upgrade of the peripheral device to avoid a host device error or complete system failure, as previously described in connection with FIG. 2. One prior art method to avoid a host access to the peripheral device during the shutdown and restart stages of a peripheral device firmware upgrade process is to upgrade the firmware of the peripheral device from the Basic Input/Output System (BIOS) of the host device.

However, upgrading the peripheral device firmware through the BIOS during the BIOS initialization phase of the host device's boot process precludes the host device from running its OS, limiting the functionality of the host device until the peripheral device is done upgrading its firmware and the OS eventually boots. This method is, therefore, particularly unsuitable for a number of applications with a larger number of peripheral devices, such as a storage server where the entire server and all storage drives must be shut down in order to upgrade the firmware of a single storage drive. Moreover, even if there is only a single peripheral device, upgrading the peripheral device firmware through the BIOS is a time-consuming process and may be unfamiliar to the vast majority of casual computer users.

Another prior art method is to power-cycle the host device and peripheral device to upgrade the firmware, as the host device will not be able to access the peripheral device when the host device is powered down, and upon powering back up, the peripheral device will be initialized with the new firmware. However, power-cycling is also undesirable in many circumstances as it increases the down-time of the host device and inconveniences the user as the user is unable to perform any operations with the host device during the power-cycle.

There is, therefore, an unmet demand for a host-safe method of upgrading the firmware of a PCIe device from the OS of the host device while minimizing any interruption to the normal operation of the host device.

BRIEF DESCRIPTION OF THE INVENTION

In one embodiment, a method of upgrading a firmware of a peripheral device connected to a host device via a PCIe bus from the OS of the host device includes halting host device access to the peripheral device after detecting the peripheral device has completed a shutdown sequence, and resetting the peripheral device after a predetermined time period after completion of the shutdown sequence. The method further includes initializing the firmware stored in a persistent storage location of the peripheral device and re-establishing a connection between the peripheral device and the host device. In one embodiment, the method further includes polling a status of the peripheral device to detect the peripheral device has completed the shutdown sequence. In one embodiment, polling the status of the peripheral device includes reading a register of the peripheral device corresponding to either an active or a shutdown state of the peripheral device.

In one embodiment, the method further includes transferring the firmware from the host device to a buffer storage location of the peripheral device. The firmware is then loaded from the buffer storage location to the persistent storage location of the peripheral device. In one embodiment, the method further includes initiating the shutdown sequence after the firmware is loaded to the persistent storage location of the peripheral device. In another embodiment, the method further includes setting a state of the peripheral device to a pending update state once the firmware is loaded to the persistent storage location of the peripheral device, and beginning the predetermined time period after detecting both the peripheral device has completed the shutdown sequence and the pending update state is set.

In one embodiment, the peripheral device is a data storage device. In another embodiment, the peripheral device is a Non-Volatile Memory Express (NVMe)-compliant data storage device. In yet a further embodiment, the NVMe-compliant storage device is a Solid State Drive (SSD). In one embodiment, the shutdown sequence of the peripheral device includes performing all processes necessary for the peripheral device to shut down. In one embodiment, resetting the peripheral device includes shutting down and restarting the peripheral device. In the embodiment where the peripheral device is an NVMe-compliant data storage device, the shutdown sequence includes disabling one or more NVMe command queues and performing a Flash Translation Layer (FTL) flush.

In one embodiment, the predetermined time period is selected to be greater than a time it takes for the host device to detect the peripheral device has completed the shutdown sequence. In one embodiment, the predetermined time period is between 1 ms and 200 ms. In one embodiment, re-establishing the connection between the peripheral device and the host device includes a link negotiation setting a link width and a link speed of the PCIe bus.

In one embodiment, the methods discussed above may be implemented in software, firmware, or any other program code or code segments executed by a processor of the host device as instructions stored in a computer readable medium. The computer readable medium may be transitory or non-transitory computer-readable media, such as physical disk storage devices or chip memory devices. In addition, a computer readable medium comprising instructions for performing the aforementioned method steps of upgrading a firmware of a peripheral device connected to a host device via a PCIe bus from the OS of the host device may be located on a single device or computing platform, or may be distributed across multiple devices or computing platforms.

DETAILED DESCRIPTION OF THE INVENTION

Figure 3:
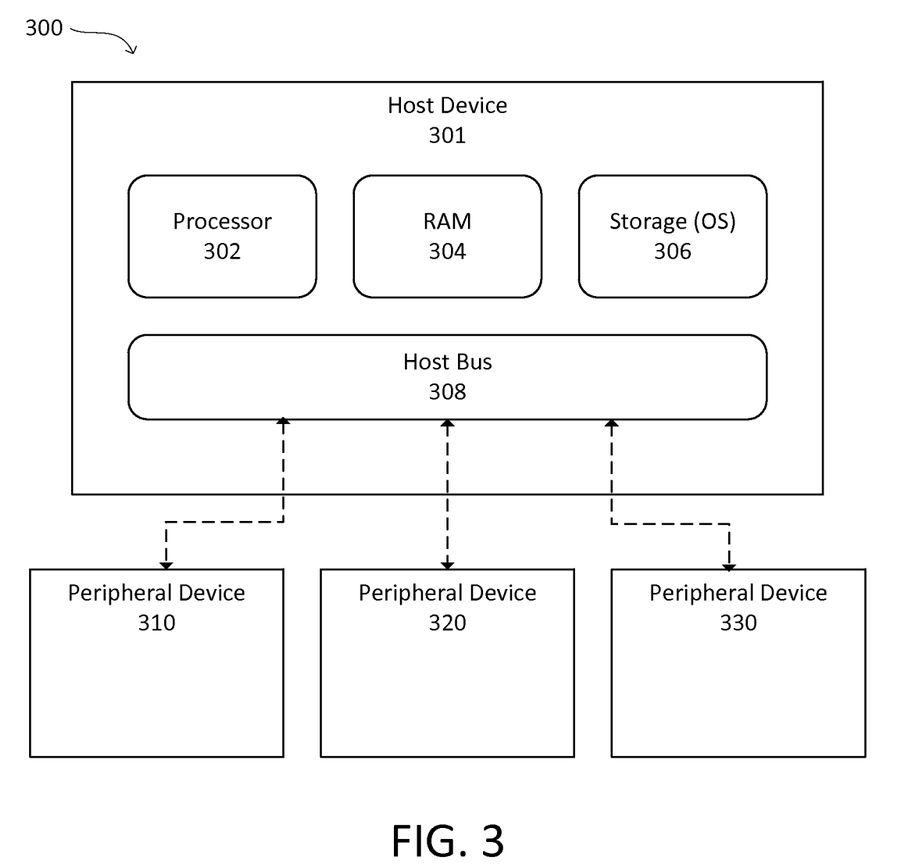
FIG. 3 is a block diagram of a plurality of peripheral devices connected to a host device in a computer system, according to one embodiment of the invention.

FIG. 3 shows a block diagram of a plurality of Peripheral Devices 310, 320, and 330 connected to a Host Device 301 in a computer system 300, according to one embodiment of the invention. As shown in FIG. 3, Host Device 301 comprises a Processor 302, Random Access Memory (RAM) 304, Storage 306, and Host Bus 308. The Host Bus 308 may be any communications interface where the Peripheral Devices 310, 320, and 330 are directly connected to the Host Device 301. In one embodiment, the Host Bus 308 is a PCIe bus, and Peripheral Devices 310, 320, and 330 are PCIe-compatible devices.

An OS is stored on and executed from Storage 306, the OS managing hardware and software resources of both the Host Device 301 and Peripheral Devices 310, 320, and 330 connected to the Host Device 301 via Host Bus 308. The Storage 306 may be any storage device suitable of storing and executing the OS of the Host Device 301. In one embodiment, Storage 306 is a Hard Disk Drive (HDD). In another embodiment, Storage 306 is a SDD. In yet another embodiment, Storage 306 is a Solid State Hybrid Drive (SSHD). The OS on Storage 306 may be any commercially available or private OS capable of managing the Host Device 301 and Peripheral Devices 310, 320, and 330. In one embodiment, the OS is a Windows™ OS developed by Microsoft Corporation, such as Windows™ 10, Windows™ 8.1, Windows™ 7, etc. In another embodiment, the OS is a Mac™ OS developed by Apple, Inc., such as Mac OS X™. In yet another embodiment, the OS is a Linux™ OS, such as Ubuntu, Red Hat, or Debian.

A variety of Peripheral Devices 310, 320, and 330 may be connected to the Host device 301 via the Host Bus Interface 308. For example, Peripheral Devices 310, 320, and 330 may include computer graphics cards, network adapters, SSDs, etc. It should be understood that more devices may be connected to the Host Device 301 via Host Bus 308 than the three Peripheral Devices 310, 320, and 330 shown in FIG. 3. Generally, the number of peripheral devices that may be connected to Host Device 301 depends on the bus width of the Host Bus 308 and the number of physical connectors available on the Host Device 301. Moreover, Peripheral Devices 301, 320, and 330 may be located in the same enclosure as the Host Device 301, or in a separate enclosure and connected to the Host Bus 308 of the Host Device 301 with a suitable cable or adapter. For example, a graphics card may be directly connected to the physical connector of the Host Bus 308 on the motherboard of the Host Device 301, and, simultaneously, an SSD may be placed in a separate enclosure external to the Host Device 301 and connected to the Host Bus 308 of the Host Device 301 using a cable.

Figure 4:
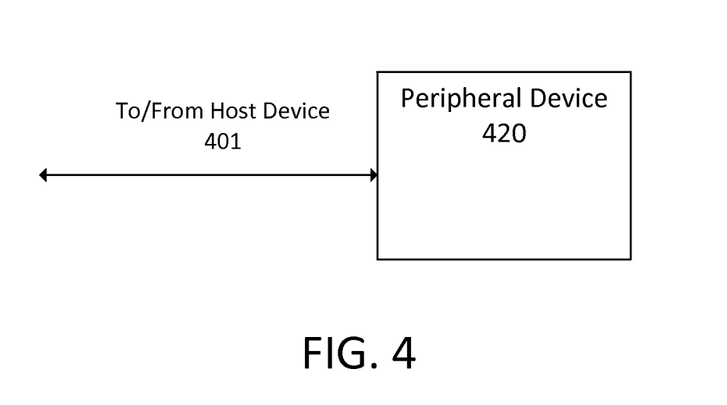
FIG. 4 is a block diagram of a peripheral device directly connected to a host device, according to one embodiment of the invention.

FIG. 4 shows a block diagram of a Peripheral Device 420 directly connected to a Host Device 401. In contrast with FIG. 1, as shown in FIG. 4 there is no HBA between the Host Device 401 and the Peripheral Device 420, thus eliminating the increased latency, power consumption, and physical footprint introduced by the HBA. However, without an HBA managing the communication between the Host Device 401 and the Peripheral Device 420, the communication between the Host Device 401 and the Peripheral Device 420 must be governed by a standard to ensure that the Host Device 401 and Peripheral Device 420 are "communicating in the same language," so to speak.

For example, if Peripheral Device 420 is an SSD connected to the Host Device 401 via a PCIe bus, the NVMe standard may govern the communication between the Host Device 401 and the Peripheral Device 420. NVMe is a standard defining a register interface, command set, and feature set for SSD PCIe devices. The Host Device 401 may directly issue commands, receive responses, and, in effect, control the Peripheral Device 420 under the NVMe standard where the Peripheral Device 420 is an SSD PCIe device.

As previously discussed, for peripheral devices that are directly connected to a host device via a PCIe bus, the removal of the HBA presents a number of challenges, particularly for updating the firmware of the peripheral device. Because there is no HBA to isolate a peripheral device from the host device, it is possible for the host device to attempt to access the peripheral device before the peripheral device has completed its firmware upgrade, either during the shutdown, restart, or initialization stages. If the host device attempts to access the peripheral device during one of these stages, the lack of a response by the peripheral device can cause the host device to experience an error. How such a fault is handled by the host device varies based on the OS of the host device. However, such an error is a serious one, and the typical method of fault processing is for the OS to treat it as an unrecoverable error which can result in a fatal system error where the host device reports the error then halts. For example, such a fatal system error on the Windows™ OS causes what is colloquially known as the Blue Screen of Death (BSOD), requiring the host device to be restarted where the host device will be reset, in order to clear the error and to restart operation.

Figure 5:
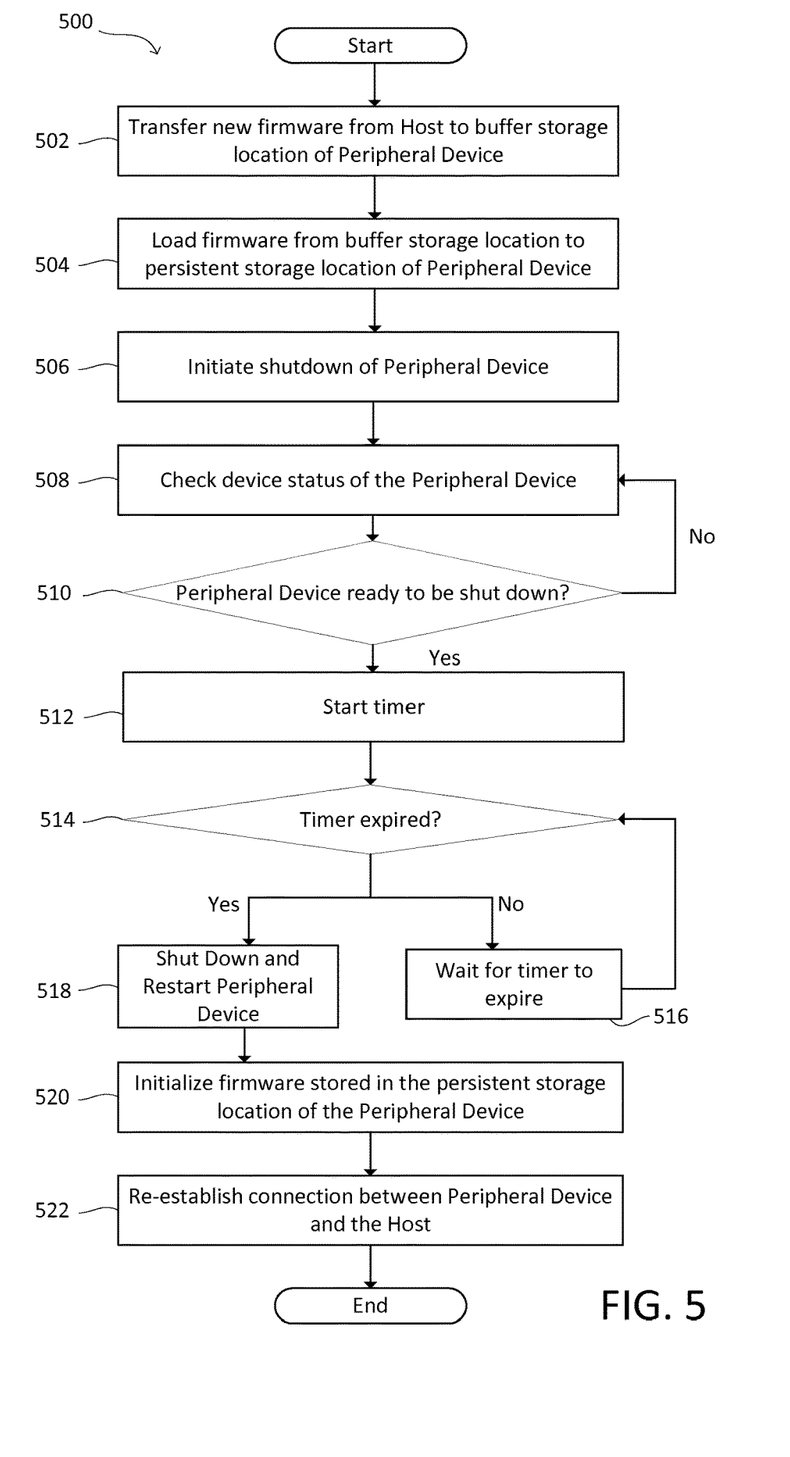
FIG. 5 is a flowchart of method steps for upgrading the firmware of a peripheral device directly connected to a host device, according to one embodiment of the invention.

FIG. 5 shows a flowchart of method steps 500 for upgrading the firmware of a peripheral device directly connected to a host device, according to one embodiment of the invention. The peripheral device is directly connected to a host device via a host bus. In one embodiment, the host bus is a PCIe bus and the peripheral device may be any PCIe device, such as a storage device, a graphics card, a network card, or any other device compatible with the PCIe bus. At step 502, the OS of the host device, either through a user command or an automated software algorithm, causes a new peripheral device firmware to be transferred over the host bus to a buffer storage location of the peripheral device. The new peripheral device firmware may contain bug fixes or new features that improve the features, performance, reliability, or all three, of the peripheral device. The buffer storage location is a non-persistent storage that stores temporary data.

After the new peripheral device firmware has been completely transferred to the peripheral device, at step 504, the host device informs the peripheral device that the entirety of the firmware has been transferred and the peripheral device loads the new firmware from the buffer storage location to a persistent storage location. In one embodiment, the persistent storage location of the peripheral device is specifically configured to store the firmware of the peripheral device. On the host device side, after the new firmware transfer has been completed, the host device prepares to stop using the peripheral device. The OS of the host device instructs the peripheral device driver, a software interface that enables the OS to access hardware functions of the peripheral device, to unmount the peripheral device such that the peripheral device is no longer visible to the OS user or automated software algorithm running on the OS.

This process may also be referred to as a "warm-unplug" of the peripheral device. A warm-unplug is similar to a "hot-unplug" where the peripheral device is disconnected from the host device without powering down the host device, but the warm-unplug involves notifying the host device that the peripheral device is going to be disconnected from the host before disconnecting the peripheral device. In contrast, a hot un-plug simply disconnects the peripheral device with no warning to the host device.

At step 506, the peripheral device driver initiates shutdown of the peripheral device. In response, the peripheral device begins preparing for shutdown by initiating a shutdown sequence comprising processes necessary for the peripheral device to safely shut down; including disabling command queues, making sure all necessary data is stored in persistent memory and flushing the buffer, etc. Shutting down the peripheral device may take a bit of time depending on the operations the device is performing in order to shut down. Typically, this process should take a few seconds. During this time, at step 508, the peripheral device driver periodically checks, or polls, the status of the peripheral device to determine if the peripheral device has completed all of the necessary operations and is ready to be shutdown. The peripheral device driver polls the status of the peripheral device, for example, every 100 ms. In one embodiment, the peripheral device driver polls the status of the peripheral device by reading a device status register of the peripheral device, where the device status register indicates whether the device is ready to be shut down.

At step 510, if the peripheral device is not ready to be shut down, the peripheral device driver will continue to poll the status of the peripheral device. At step 512, after the peripheral device is ready to be shut down and the peripheral device driver detects that the peripheral device status indicates the peripheral device is ready to be shut down, the peripheral device starts a timer having a predetermined time period. The purpose of this timer is to give the host device time to halt all access to the peripheral device to ensure that the host device will not attempt to access the peripheral device when the peripheral device is shut down and restarted in order to complete the firmware upgrade. As previously mentioned, attempting to access the peripheral device during the shutdown or restart of the peripheral device may cause the host device to experience an error as the peripheral device is directly connected to the host device, and in a worst-case scenario, a complete host device system crash such as a BSOD. Within the predetermined time period, the peripheral device driver and host OS complete detaching and the host device no longer access the peripheral device over the host bus interface.

At step 514, the timer continues to countdown from the predetermined time period. The predetermined time period should be longer than the time it takes for the device status of the peripheral device to reach the host device after the device driver polls the status of the peripheral device. Otherwise, the peripheral device driver may attempt to poll the status of the peripheral device after the peripheral device has shut down or is in the process of resetting because it has not yet received the device status of the peripheral device indicating the device is ready to be shut down, which, as previously explained, will result in a host device error or complete system failure.

Preferably, the predetermined time is selected to be the time it takes for the device status of the peripheral device to reach the host device and an additional amount of time to ensure the peripheral device driver and host OS halt access to the peripheral device and complete detaching the peripheral device. In one embodiment the predetermined time period is between 1 ms and 200 ms. In step 516, if the timer has not completed counting down from the predetermined time period, the peripheral device continues to wait for the timer to expire. At step 518, after the timer expires, the peripheral device shuts down and the peripheral device's link to the host bus interface goes down.

At step 520, the peripheral device restarts and initializes the new firmware stored in the persistent storage location. At this step, the firmware upgrade of the peripheral device is completed. At step 522, the peripheral device restarts the host bus link. The link negotiations with the host device occur automatically. The link negotiations include, for example, the width of the bus and the operating speed of the peripheral device and the host device. The link negotiation process and parameters are typically defined by the standard governing the host bus. In the case where the host bus interface is PCIe version 3.0, for example, the bus width can be ×1, ×2, ×4, ×8, or ×16 physical lanes, operating at 8 Gbit/s per lane as defined by the PCIe v.3.0 standard. Link negotiations typically take a few seconds after the peripheral device restarts the host bus link. After the host bus link between the peripheral device and host device is established, the host device OS is instructed (either by the user or automated software algorithm) to scan for and detect the peripheral device. After the host device OS detects the peripheral device, the peripheral device driver attaches the peripheral device so that the host device may resume using the peripheral device. This process may also be referred to as a "warm-plug" of the peripheral device, corresponding to the warm-unplug process described in step 504, above.

Upgrading the firmware of a peripheral device by performing the aforementioned method steps 500 provides a number of improvements over the prior art. In particular, by performing the method steps 500, the occurrence of a host device error or failure is substantially reduced, if not altogether eliminated, while upgrading the firmware of the peripheral device from within the OS of the host device and maintaining the functionality of the OS. This is because both the host device and the peripheral device are aware of the impending shutdown and restart of the peripheral device by virtue of the peripheral device driver detecting the peripheral device is ready to be shut down, and the peripheral device waits a predetermined amount of time to ensure the host device completely halts accessing the peripheral device before the peripheral device is shut down and restarted.

Thus, upgrading the firmware of the peripheral device described in method steps 500 will have the same reliability and robustness as if an HBA were used to upgrade the firmware of the peripheral device as described in method steps 400 shown in FIG. 4, without the added latency and reduced peripheral device performance that an HBA introduces. Moreover, method steps 500 are performed while the OS of the host device is running, allowing for the firmware upgrade of peripheral devices without limiting the functionality of the host device or requiring any down-time of the host device.

Figure 6:
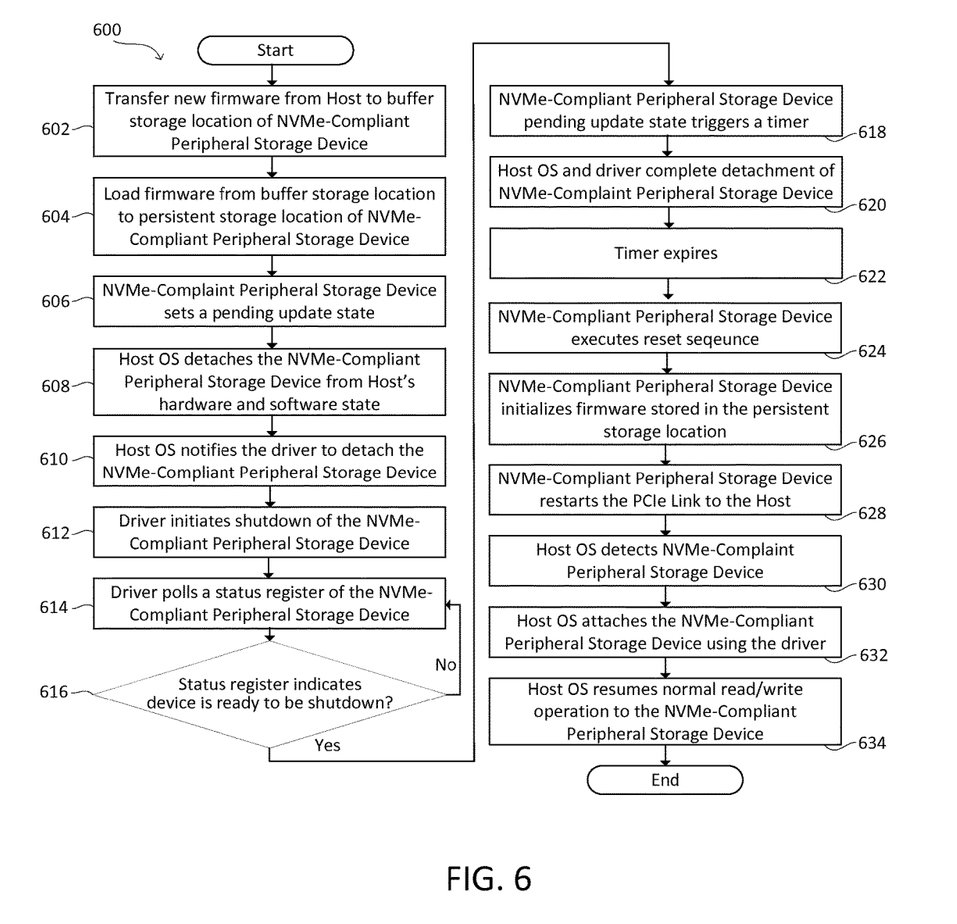
FIG. 6 is a flowchart of method steps for upgrading the firmware of an NVMe-compliant SSD device directly connected to a host device, according to one embodiment of the invention.

FIG. 6 is a flowchart of method steps 600 for upgrading the firmware of an NVMe-compliant peripheral storage device directly connected to a host device, according to one embodiment of the invention. In one embodiment, the NVMe-compliant peripheral storage device is an SSD, such as the OCZ Z-Drive 6000. The NVMe-compliant peripheral storage device is connected to the host device via a PCIe bus. At step 602, the OS of the host device, either through a user command or an automated software algorithm, causes new firmware for the NVMe-compliant peripheral storage device to be transferred over the PCIe bus to a buffer storage location of the NVMe-compliant peripheral storage device. The NVMe-compliant peripheral storage device holds the firmware in the buffer storage location until the host device informs the NVMe-compliant peripheral storage device the new firmware has completed transferring.

At step 604, after the new firmware has completed transferring from the host device, the NVMe-compliant peripheral storage device writes the buffer storage location containing the firmware update to a persistent storage location of the NVMe-compliant peripheral storage device. At step 606, the NVMe-compliant peripheral storage device sets a Pending Update state, indicating that the new firmware has been loaded and a firmware upgrade is pending. On the host device side, after the new firmware transfer to the NVMe-compliant peripheral storage device is complete, the host device prepares to stop using the NVMe-compliant peripheral storage device. The OS of the host device, again either through a user command or the automated software algorithm, instructs the NVMe-compliant peripheral storage device driver to unmount the device. At step 608, the host device OS detaches the peripheral device from its software and hardware states, i.e. the NVMe-compliant peripheral storage device is warm un-plugged from the host device.

At step 610, the host device OS notifies the NVMe-compliant peripheral storage device driver to detach the NVMe-compliant peripheral storage device. At step 612, the NVMe-compliant peripheral storage device driver initiates shutdown of the NVMe-compliant peripheral storage device, including disabling NVMe command queues, writing necessary data to persistent memory, flushing the FTL, etc. During the shutdown sequence, the NVMe-compliant peripheral storage device driver periodically reads, or polls, a status register (CSTS) of the NVMe-compliant peripheral storage device at step 614 in order to detect whether the NVMe-compliant peripheral storage device is ready to be shut down.

At step 616, if the CSTS register indicates the NVMe-compliant peripheral storage device is not ready to be shut down, step 614 is repeated and the NVMe-compliant peripheral storage device driver continues to poll the CSTS register. In one embodiment, the NVMe-compliant peripheral storage device driver reads the CSTS register once every 100 ms until the CSTS register indicates the NVMe-compliant peripheral storage device is ready to be shut down. Once the NVMe-compliant peripheral storage device is ready to be shut down, i.e., the NVMe-compliant peripheral storage device has completed its shutdown sequence, the CSTS register is updated accordingly.

At step 618, as the NVMe-compliant peripheral storage device responds to the CSTS read request by the peripheral device driver indicating that the NVMe-compliant peripheral storage device is ready to be shut down, the NVMe-compliant peripheral storage device also detects the Pending Update state is set. This starts a timer of the NVMe-compliant peripheral storage device, the timer having a predetermined time period. Once the CSTS read response reaches the host device, both the host device and the NVMe-compliant peripheral storage device are aware that a shutdown and restart of the NVMe-compliant peripheral storage device is imminent. Again, as previously discussed, the timer gives the host device time to halt read/write operations and all other access to the NVMe-compliant peripheral storage device. The predetermined time period should be longer than the time it takes for the response to the CSTS read request to reach the host device, and preferably includes additional time to ensure the host device halts accessing the NVMe-compliant peripheral storage device. In one embodiment, the predetermined time period is between 1 ms and 200 ms.

At step 620, as the timer is counting down from the predetermined time period, the OS and the NVMe-compliant peripheral storage device driver complete detachment of the NVMe-compliant peripheral storage device. After the timer expires at step 622, the NVMe-compliant peripheral storage device executes a reset sequence (a shutdown followed by a restart) at step 624. When the NVMe-compliant peripheral storage device shuts down, the PCIe link with the host device goes down. At step 626, the NVMe-compliant peripheral storage device restarts and initializes the new firmware stored in persistent storage. After the new firmware is initialized, at step 628, the NVMe-compliant peripheral storage device restarts the PCIe link to the host device. PCIe link negotiations with the host device start automatically. At step 630, after the PCIe lane width (either ×1, ×2, ×4, ×8, or ×16 physical lanes) and operating speed is set (depending on the version of the PCIe standard utilized by the host device), the user or automated software algorithm instructs the OS to scan for the NVMe-compliant peripheral storage device. Once the OS detects the NVMe-compliant peripheral storage device, the peripheral device driver attaches the NVMe-compliant peripheral storage device at step 632. At step 634, the OS resumes normal read/write operation to the NVMe-compliant peripheral storage device.

As previously discussed with respect to method steps 500 shown in FIG. 5, above, updating an NVMe-compliant peripheral storage device in accordance with the method steps 600 shown and described in connection with FIG. 6 will reduce or eliminate any errors caused by the host device attempting to access the NVMe-compliant peripheral storage device while the NVMe-compliant peripheral storage device is in the process of shutting down or restarting. This is because both the host device and NVMe-compliant peripheral storage device are informed of the pending shutdown and restart of the NVMe-compliant peripheral storage device, and the NVMe-compliant peripheral storage device waits a predetermined amount of time before shutting down and restarting providing the host device ample opportunity to halt accessing the NVMe-compliant peripheral storage device.

Thus, upgrading the firmware of the NVMe-compliant peripheral storage device in accordance with method steps 600 is particularly suitable for enterprise applications where reliability, operability, and serviceability are critical. Method steps 600 allow for a host-safe firmware upgrade (improving reliability) of one or more NVMe-compliant peripheral storage devices connected to the host device without limiting the functionality of the host device or requiring any unnecessary down-time of the host device (improving the ease of servicing the peripheral devices and the overall operability of the host device).

In one embodiment, the method steps described above in FIGS. 5 and 6, above, may be implemented in software, firmware, or any other program code or code segments executed by a processor of the host device as instructions stored in a computer readable medium. The computer readable medium may be transitory or non-transitory computer-readable media. For example, in one embodiment, the computer readable medium may be Storage 306 of the Host Device 301 shown in FIG. 3. In another embodiment, the computer readable medium may be RAM 304 of the Host Device 301, also shown in FIG. 3. In yet another embodiment, the computer readable medium may be a removable storage device, such as a USB flash memory that is connected to the host device via a USB interface. In addition, a computer readable medium comprising instructions for performing the aforementioned method steps of upgrading a firmware of a peripheral device connected to a host device via a PCIe bus from the OS of the host device as described in connection with FIGS. 5 and 6 may be located on a single device or computing platform, or may be distributed across multiple devices or computing platforms.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Principles according to the present invention, and methods and systems that embody them, could be applied to other examples, which, even if not specifically described here in detail, would nevertheless be within the scope of the present invention.

What is claimed is:

1. A method of upgrading a firmware of a peripheral device connected to a host device via a Peripheral Component Interconnect Express (PCIe) bus from the operating system (OS) of the host device, the method comprising:
   halting host device access to the peripheral device after detecting the peripheral device has completed a shutdown sequence comprising performing processes necessary for the peripheral device to shut down;
   resetting the peripheral device after a predetermined time period of completion of the shutdown sequence;
   initializing the firmware stored in a persistent storage location of the peripheral device;
   re-establishing a connection between the peripheral device and the host device through a link negotiation setting a link width and link speed of the PCIe bus;
   transferring the firmware from the host device to a buffer storage location of the peripheral device;
   loading the firmware from the buffer storage location to the persistent storage location of the peripheral device;
   setting a state of the peripheral device to a pending update state once the firmware is loaded to the persistent storage location of the peripheral device; and
   beginning the predetermined time period after detecting both the peripheral device has completed the shutdown sequence and the pending update state of the peripheral device is set.

2. The method of claim 1, further comprising polling a status of the peripheral device to detect the peripheral device has completed the shutdown sequence.

3. The method of claim 2, wherein polling the status of the peripheral device comprises reading a register of the peripheral device corresponding to either an active or a shutdown state of the peripheral device.

4. The method of claim 1, further comprising initiating the shutdown sequence after the firmware is loaded to the persistent storage location of the peripheral device.

5. The method of claim 1, further comprising selecting the predetermined time period to be greater than a time it takes for the host device to detect the peripheral device has completed the shutdown sequence.

6. The method of claim 1, wherein the predetermined time period is greater than a time it takes for the host device to detect the peripheral device has completed the shutdown sequence.

7. The method of claim 1, wherein the predetermined time period is between 1 ms and 200 ms.

8. The method of claim 1, wherein the peripheral device is a data storage device.

9. The method of claim 1, wherein the peripheral device is a Non-Volatile Memory Express (NVMe)-compliant data storage device.

10. The method of claim 9, wherein the NVMe-compliant data storage device is a Solid State Drive (SSD).

11. The method of claim 9, wherein the shutdown sequence includes disabling one or more NVMe command queues and performing a Flash Translation Layer (FTL) flush.

12. A computer readable medium comprising instructions for upgrading a firmware of a peripheral device connected to a host device via a Peripheral Component Interconnect Express (PCIe) bus from the operating system (OS) of the host device by performing:
   halting host device access to the peripheral device after detecting the peripheral device has completed a shutdown sequence comprising performing processes necessary for the peripheral device to shut down;
   resetting the peripheral device after a predetermined time period after completion of the shutdown sequence;
   initializing the firmware stored in a persistent storage location of the peripheral device; and
   re-establishing a connection between the peripheral device and the host device through a link negotiation setting a link width and link speed of the PCIe bus;
   transferring the firmware from the host device to a buffer storage location of the peripheral device;
   loading the firmware from the buffer storage location to the persistent storage location of the peripheral device;
   setting a state of the peripheral device to a pending update state once the firmware is loaded to the persistent storage location of the peripheral device; and
   beginning the predetermined time period after detecting both the peripheral device has completed the shutdown sequence and the pending update state of the peripheral device is set.

13. The computer readable medium of claim 12, further comprising instructions for performing:
   polling a status of the peripheral device to detect the peripheral device has completed the shutdown sequence.

14. The computer readable medium of claim 12, further comprising instructions for performing: initiating the shutdown sequence after the firmware is loaded to the persistent storage location of the peripheral device.

15. The computer readable medium of claim 12, further comprising instructions for performing:
   selecting the predetermined time period to be greater than a time it takes for the host device to detect the peripheral device has completed the shutdown sequence.

16. The computer readable medium of claim 12, wherein the predetermined time period is greater than a time it takes for the host device to detect the peripheral device has completed the shutdown sequence.

17. The computer readable medium of claim 12, wherein the predetermined time period is between 1 ms and 200 ms.

18. The computer readable medium of claim 12, wherein the peripheral device is a data storage device.

19. The computer readable medium of claim 12, wherein the peripheral device is a Non-Volatile Memory Express (NVMe)-compliant data storage device.

20. The computer readable medium of claim 19, wherein the NVMe-compliant data storage device is a Solid State Drive (SSD).

21. The computer readable medium of claim 19, wherein the shutdown sequence includes disabling one or more NVMe command queues and performing a Flash Translation Layer (FTL) flush.

* * * * *